US010426297B2

(12) United States Patent
Oliver et al.

(10) Patent No.: US 10,426,297 B2
(45) Date of Patent: Oct. 1, 2019

(54) POWERED NUT CRACKER

(71) Applicants: Scott Staten Oliver, Stonewall, LA (US); Richard Martin Oliver, Fort Walton Beach, FL (US)

(72) Inventors: Scott Staten Oliver, Stonewall, LA (US); Richard Martin Oliver, Fort Walton Beach, FL (US)

( * ) Notice: Subject to any disclaimer, the term of this patent is extended or adjusted under 35 U.S.C. 154(b) by 389 days.

(21) Appl. No.: 15/055,776

(22) Filed: Feb. 29, 2016

(65) Prior Publication Data
US 2017/0245691 A1    Aug. 31, 2017

(51) Int. Cl.
*A47J 43/26*    (2006.01)
*A23N 5/00*    (2006.01)

(52) U.S. Cl.
CPC ............... *A47J 43/26* (2013.01); *A23N 5/00* (2013.01)

(58) Field of Classification Search
CPC .................................... A23N 5/00; A47J 43/26
USPC ......... 99/571, 568, 572, 573, 577, 578, 579, 99/580, 581–583; 30/120.1, 120.2, 120.3, 30/120.4, 120.5; 426/481–483, 479
See application file for complete search history.

(56) References Cited

U.S. PATENT DOCUMENTS

| 1,729,905 | A | 10/1929 | Voigt |
| 2,377,369 | A | 6/1945 | Potter |
| 2,642,908 | A | 6/1953 | Landgraf |
| 2,707,503 | A | 5/1955 | Johnson et al. |
| 2,812,793 | A | 11/1957 | Ford |
| 2,812,936 | A | 11/1957 | Setz |
| 2,827,087 | A | 3/1958 | Connor |
| 3,347,295 | A * | 10/1967 | Feiling ............... A23N 5/008 241/261.1 |
| 3,435,863 | A | 4/1969 | Dye |
| 3,524,486 | A * | 8/1970 | Turner ............... A47J 43/26 99/571 |
| 3,621,898 | A * | 11/1971 | Turner ............... A23N 5/00 99/571 |
| 3,841,212 | A | 10/1974 | Powell |
| 3,858,501 | A | 1/1975 | Pfeiffer |
| 4,255,855 | A | 3/1981 | Brazil |
| 4,467,710 | A | 8/1984 | Verma et al. |
| 4,485,119 | A * | 11/1984 | Price ............... A47J 43/26 426/481 |
| 4,603,624 | A | 8/1986 | Greenblatt |
| 4,665,814 | A * | 5/1987 | Harborne ............... A47J 43/26 99/571 |
| 4,831,733 | A | 5/1989 | Morrow |

(Continued)

FOREIGN PATENT DOCUMENTS

| GB | 125959 | 4/1920 |
| GB | 2 368 514 A | 5/2002 |

OTHER PUBLICATIONS

International Search Report in corresponding PCT application No. PCT/US2017/17622 dated May 8, 2017.

(Continued)

*Primary Examiner* — Dana Ross
*Assistant Examiner* — Ket D Dang
(74) *Attorney, Agent, or Firm* — Davis & Bujold PLLC; Michael J. Bujold

(57) ABSTRACT

A powered nutcracker having a frame, a first nut cracking die mounted to the frame; and a displacement generator mounted to the frame which provides force to move the first nut cracking die to crack a nut.

17 Claims, 21 Drawing Sheets

(56) References Cited

U.S. PATENT DOCUMENTS

| | | |
|---|---|---|
| 5,092,231 A | 3/1992 | Smith |
| 6,247,396 B1 * | 6/2001 | Rhett ........................ A23N 5/00 99/571 |
| D519,529 S | 4/2006 | Quantz et al. |
| 9,062,594 B2 | 6/2015 | Robinson |

OTHER PUBLICATIONS

Written Opinion of the International Searching Authority in corresponding PCT application No. PCT/US2017/17622 dated May 8, 2017.

* cited by examiner

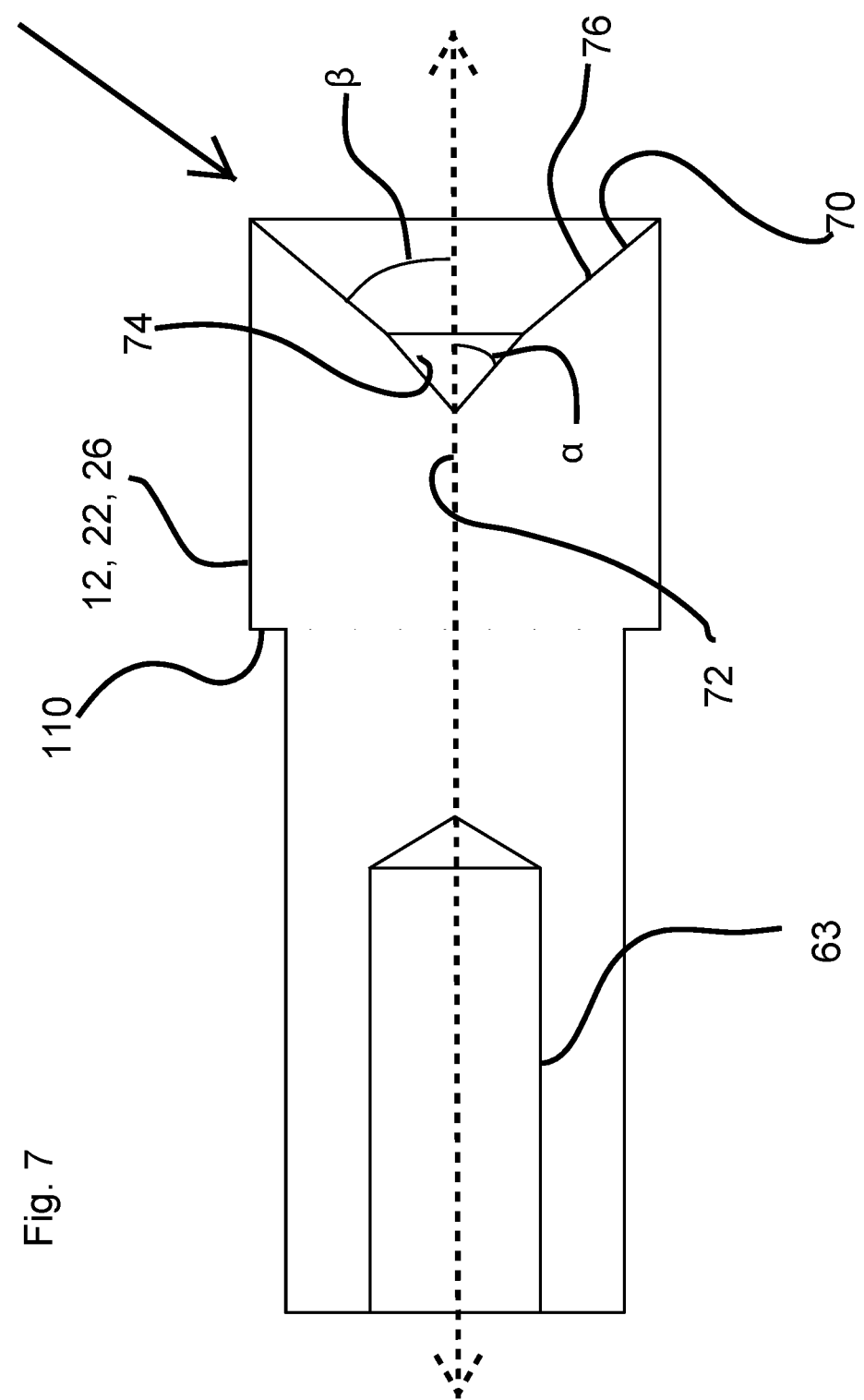

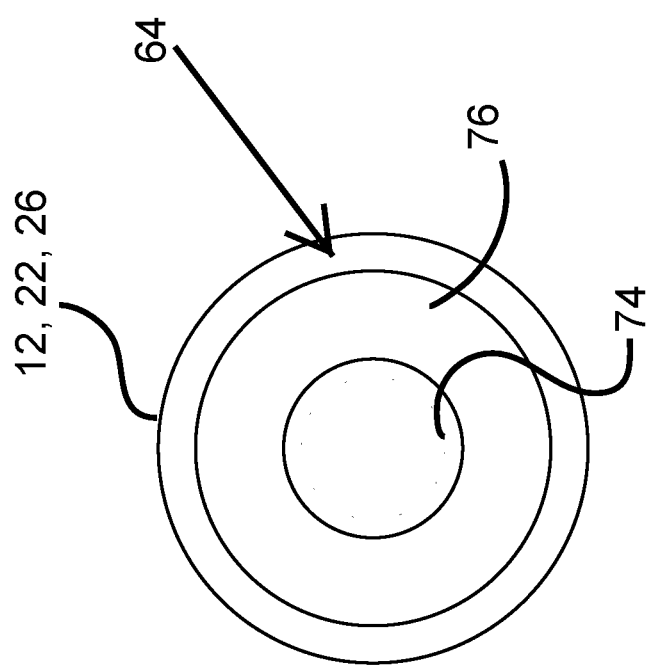

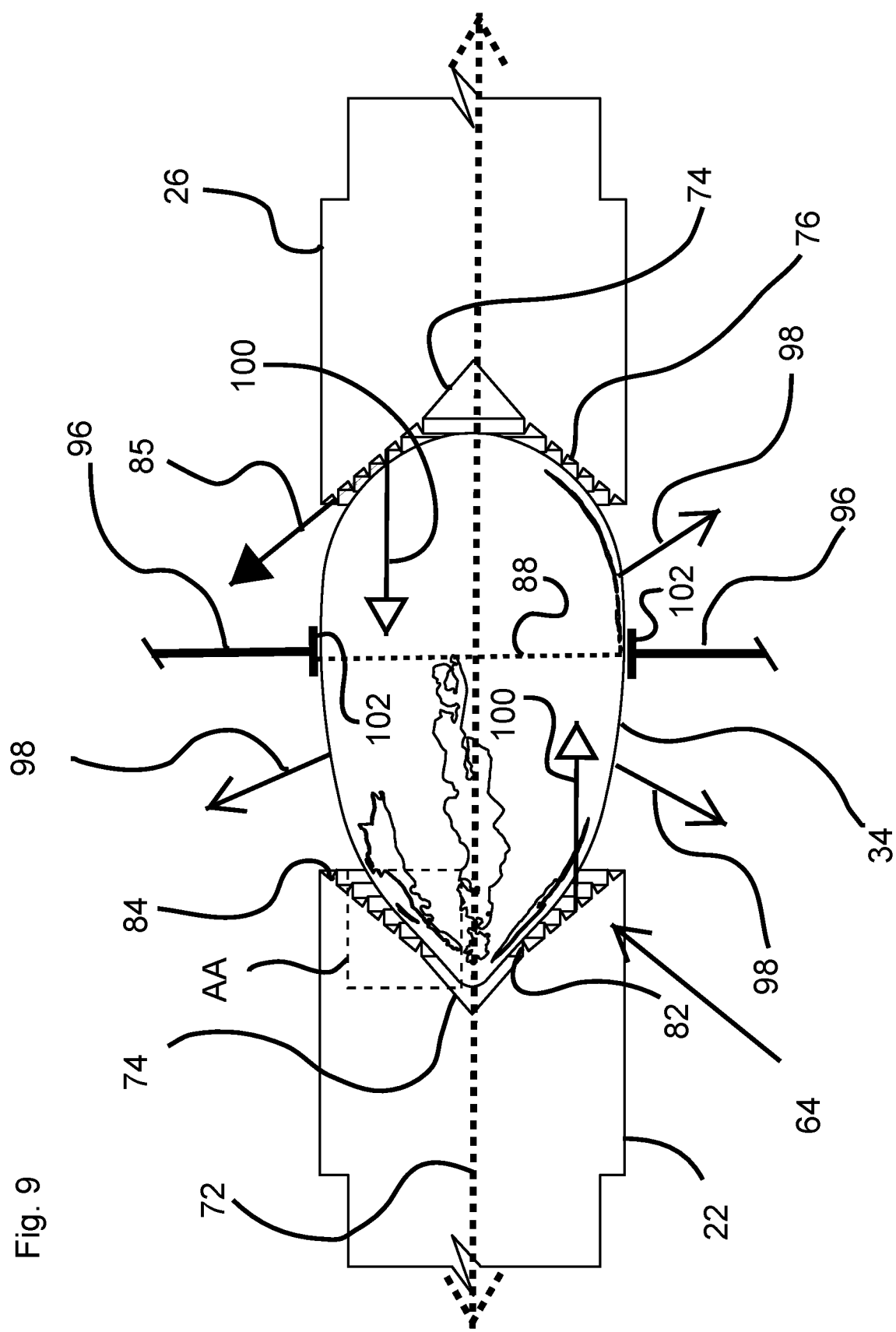

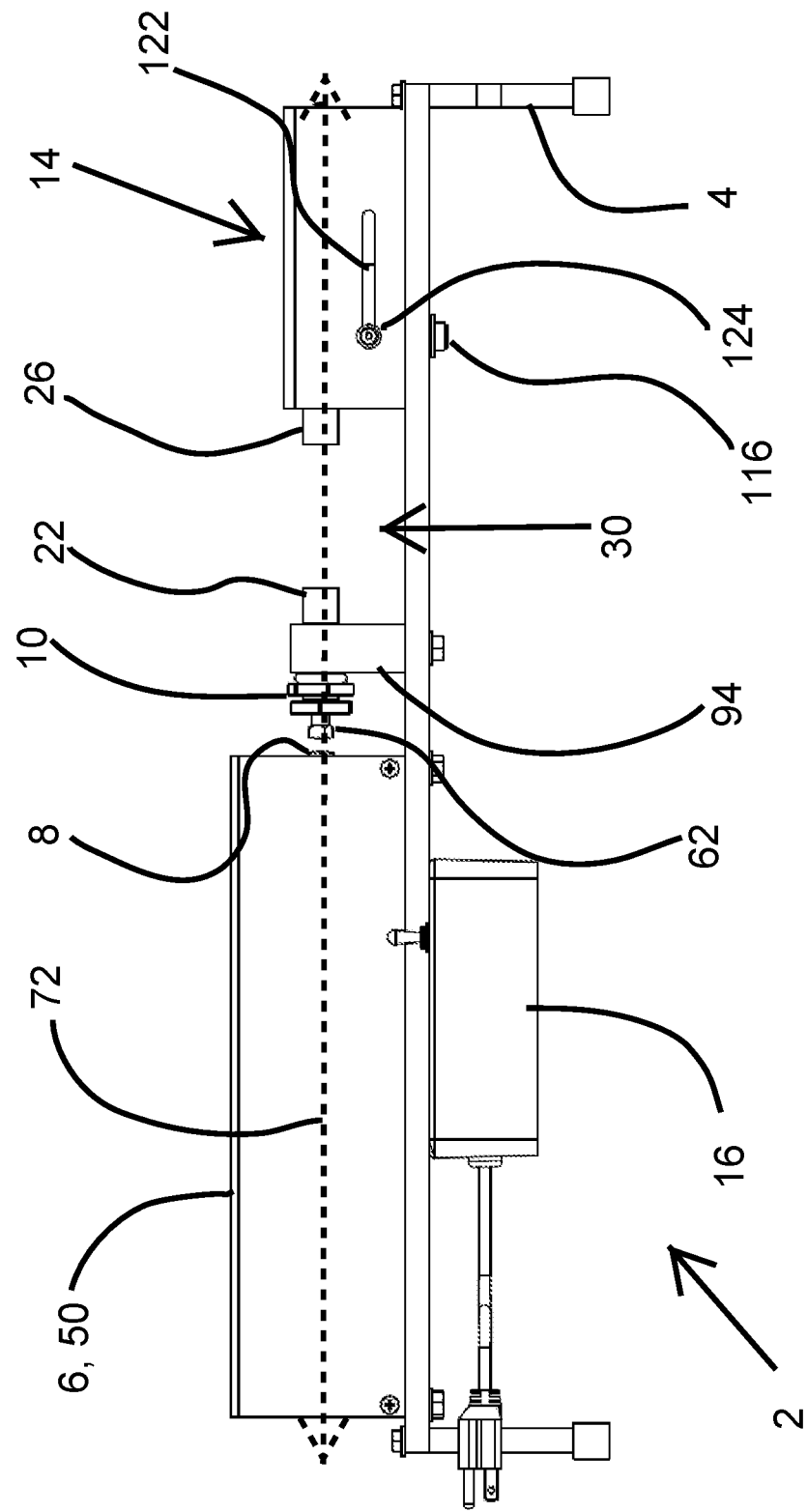

POWERED NUT CRACKER

FIELD OF THE INVENTION

The present invention relates to powered nut crackers and specifically to electrically actuated pecan nut crackers.

BACKGROUND OF THE INVENTION

Nuts are and enjoyable, healthy food, but quickly and easily cracking a nut shell and accessing the nut meat without harming the nut meat is a challenge. Nut crackers in the past have been cumbersome and do not provide good cracks. For the foregoing reasons, there is a seemingly intractable need for a powered and efficient nut cracker.

SUMMARY OF THE INVENTION

The present invention is directed to a method and nut cracker that satisfies this need, and overcomes the above mentioned shortcomings and drawbacks associated with the current technology.

Another object of the present invention is to provide a nut cracker that cracks a variety of tree nuts using an electrically actuated force applied evenly around two ends of the tree nut such that the outer shell is cracked leaving the nut meat inside relatively unharmed.

The invention is directed to powered nutcrackers having a frame, a first nut cracking die mounted to the frame; and a displacement generator mounted to the frame which provides force to move the first nut cracking die to crack a nut.

The invention is also directed to methods of cracking a nut with a powered nut cracker having a frame, a first nut cracking die mounted to the frame, one of a nut seat and a second nut cracking die mounted to the frame, a force generator mounted to the frame, and a force transmitter retained by the force generator. The methods comprise the steps of placing a nut in between the first nut cracking die and the one of the nut seat and the second nut cracking die, activating the force generator, moving the force transmitter with respect to the frame, moving the first cracking die with respect to the frame one of axially, rotationally, and both axially and rotationally; and cracking the nut.

The invention, in further embodiments, is further directed to powered nut crackers comprising a frame. A first nut cracking die is radially captively mounted to the frame within a displacement limiter, the displacement limiter adjustably limiting an axial displacement of the first nut cracking die. A second nut cracking die is radially captively mounted to the frame within a length adjuster, the length adjuster allowing the second nut cracking die to be positioned at variable distances from the first nut cracking die. A force generator is mounted to the frame. A linear motor is the force generator. A rotor of the linear is a force transmitter transmitting a force from the force generator to the first nut cracking die. One of the first and the second nut cracking die has a concavity with a surface extending at first and second angles to a cracking die axis, where the first angle is smaller than the second angle. The first angle is defined in a surface of an inner concavity of the first nut cracking die and the second angle is defined in a surface of an outer concavity of the first nut cracking die. The inner concavity is adjacent to the outer concavity. The nut cracking die has one of one or more concentric teeth disposed on a surface of a concavity of the nut cracking die, one or more linear teeth disposed on the surface of the concavity of the nut cracking die, and one or more concentric teeth disposed on a surface of a concavity of the nut cracking die.

Various objects, features, aspects, and advantages of the present invention will become more apparent from the following detailed description of preferred embodiments of the invention, along with the accompanying drawings in which like numerals represent like components

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which;

FIG. 7 is a side cross sectional view of the cracking die of FIG. 6;

FIG. 8 is a is a front plan view of the cracking die of FIG. 6;

FIG. 9AA is an upclose view of the concentric teeth from the box AA in FIG. 9;

FIG. 20 is a side plan view of the nut cracker of FIG. 1;

DETAILED DESCRIPTION OF THE INVENTION

Figure 1:
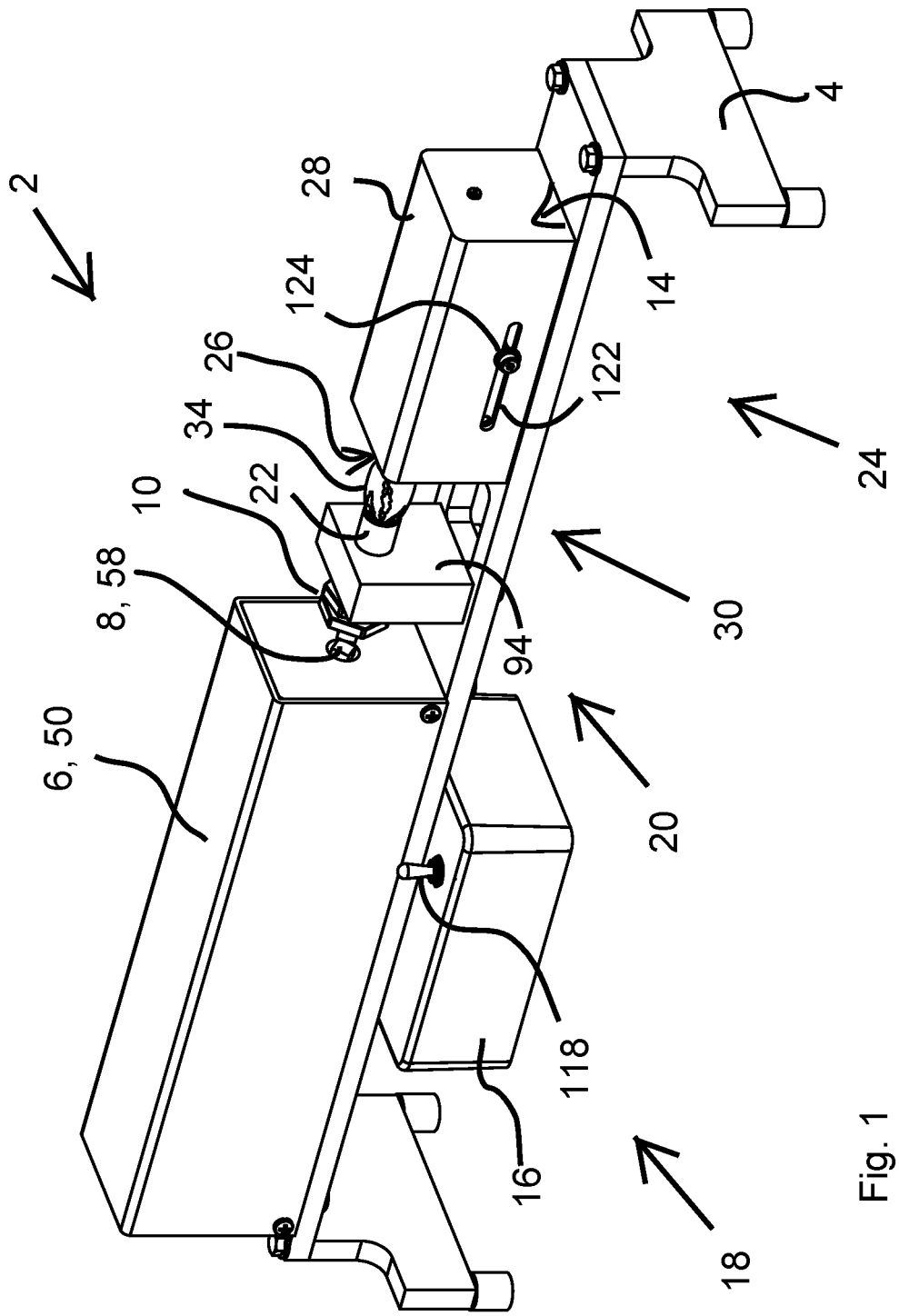
FIG. 1 is an perspective view of the nut cracker according to the present invention.

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1, 2, and 20-23, a brief description concerning the various components of the present invention will now be briefly discussed. As can be seen in this embodiment, the nut cracker 2 includes a frame 4, a displacement generator 6, a force transmitter 8, a displacement limiter 10, one or more cracking dies 12, a length adjustment device 14, and a control module 16.

Figure 2:
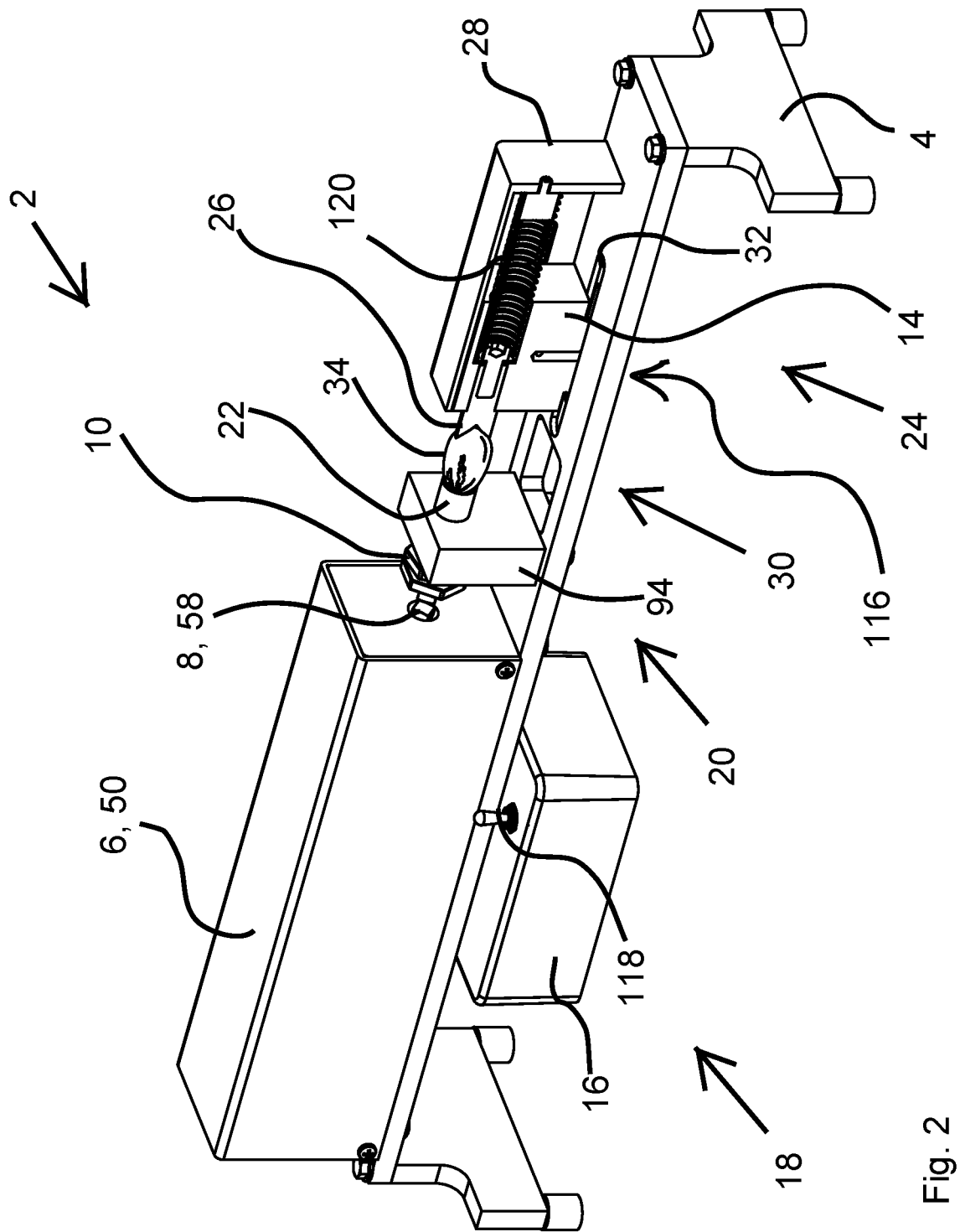
FIG. 2 is a partially cut out perspective view of the nut cracker of FIG. 1.
Figure 3:
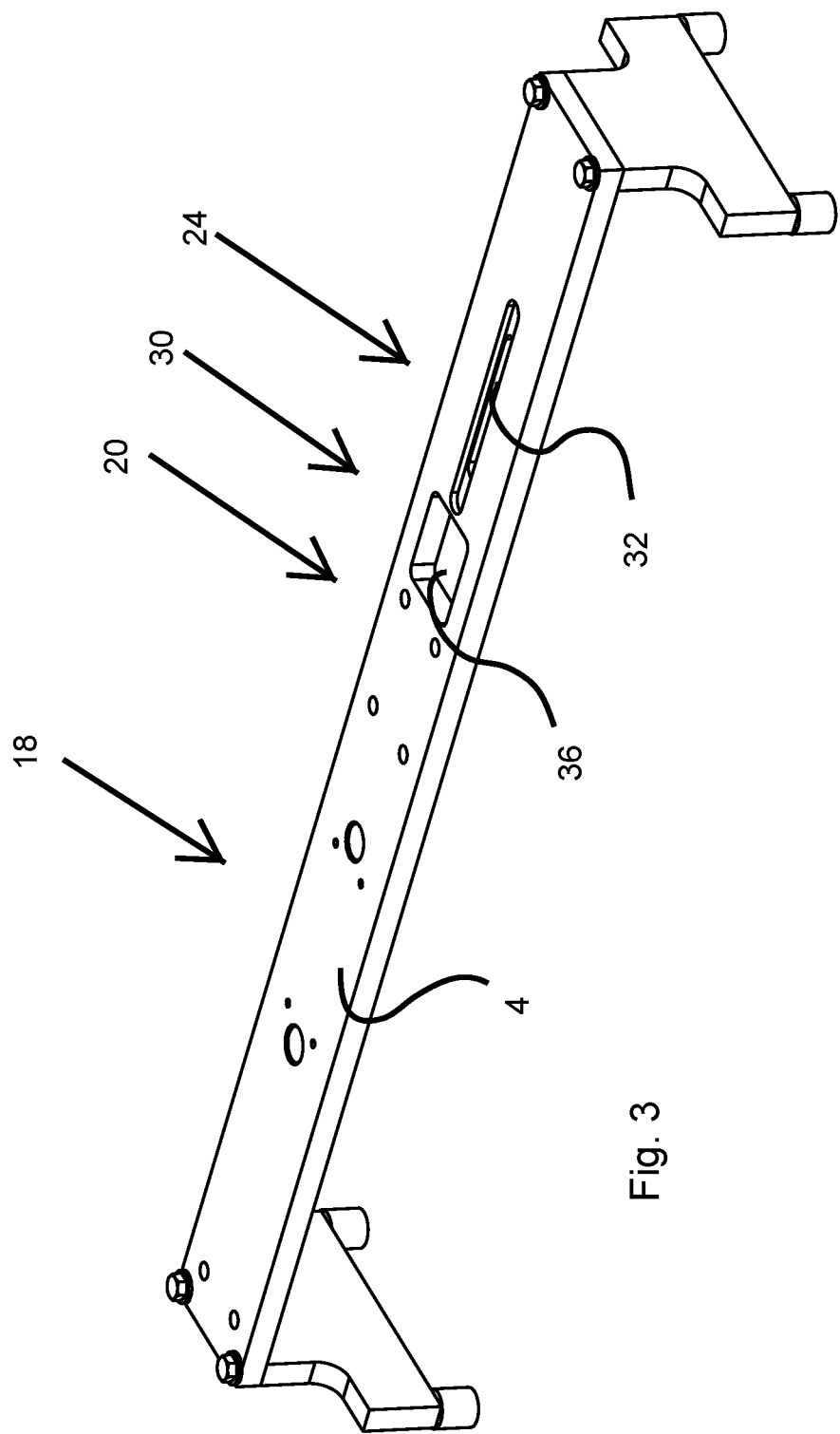
FIG. 3 is a perspective view of the frame of FIG. 1.
Figure 4:
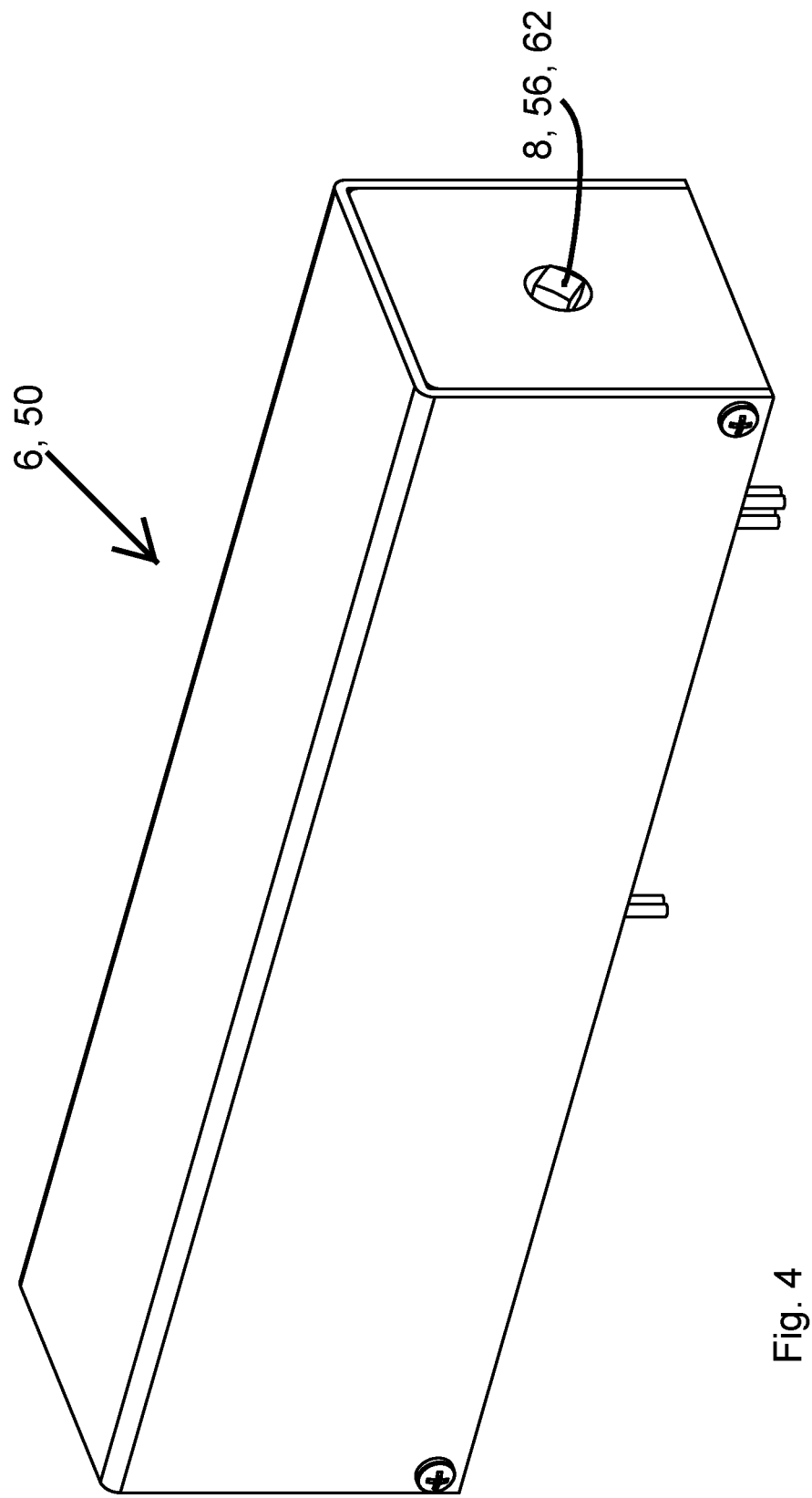
FIG. 4 is a perspective view of the displacement generator, displacement resetter, and force transmitter of FIG. 1.
Figure 5:
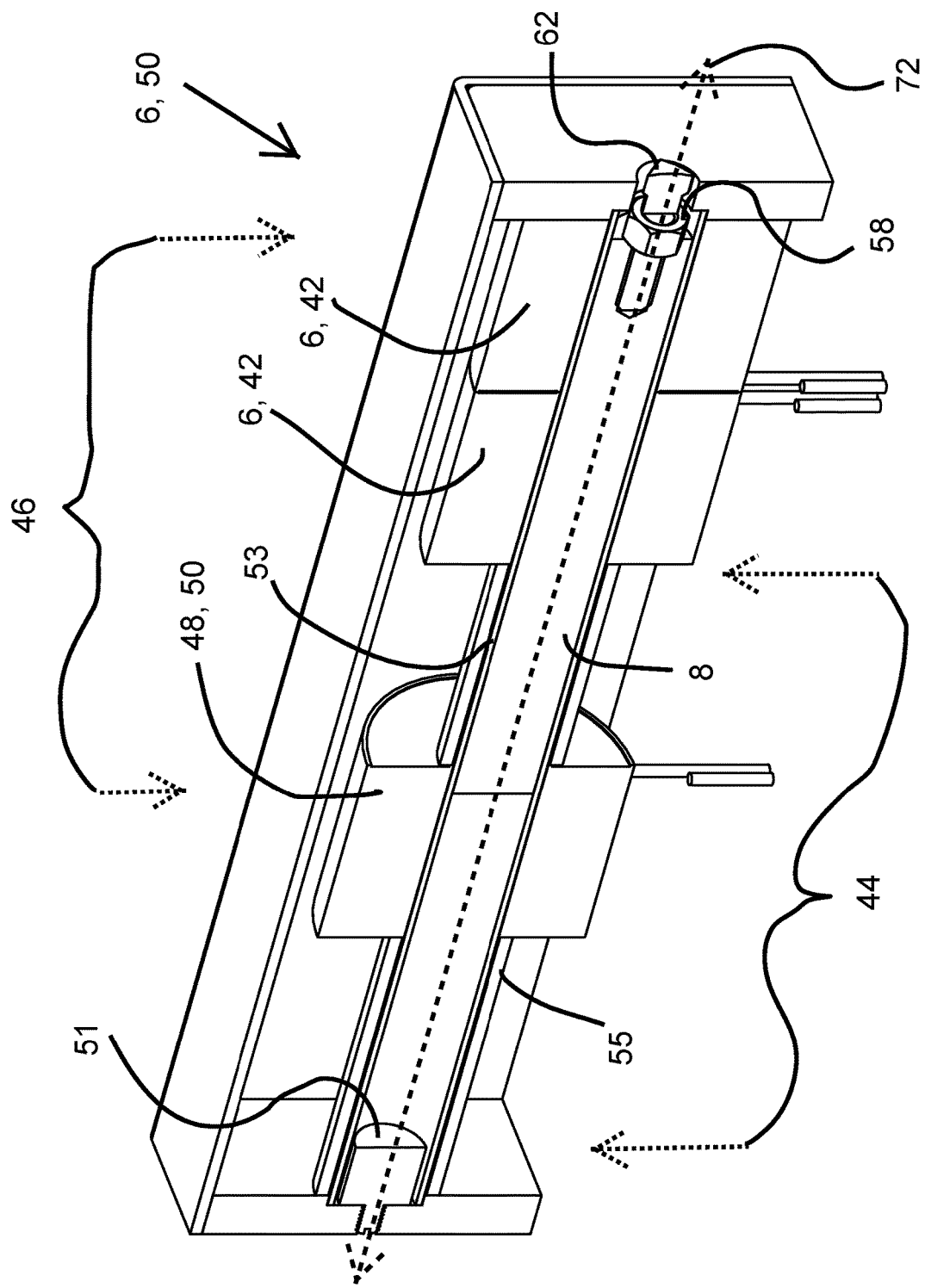
FIG. 5 is a perspective cross sectional view of the displacement generator, displacement resetter, and force transmitter of FIG. 4.
Figure 6:
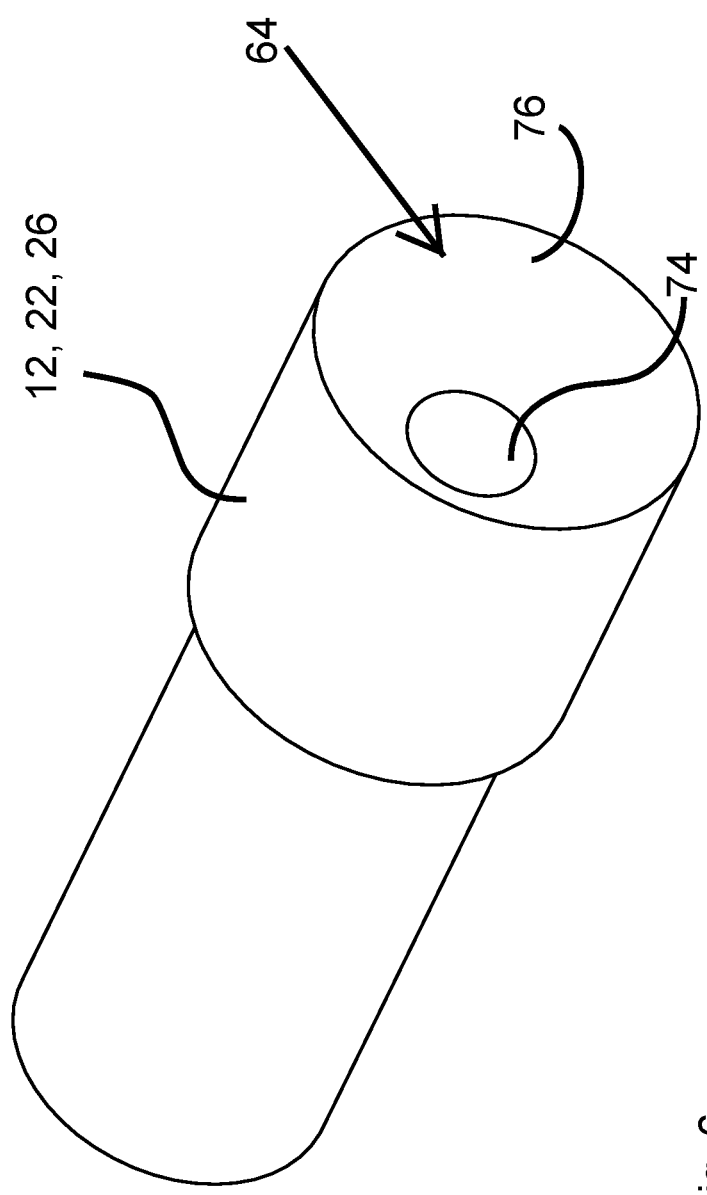
FIG. 6 is a perspective view of a first embodiment of a cracking die of FIG. 1.

Frame:

The frame 4 provides a platform for other components to mount to. The frame 4 shown is generally elongate with a first portion 18 that mounts the displacement generator 6 and force transmitter 8, a second portion 20 that mounts the displacement limiter 10 and a leading cracking die 22, and a third portion 24 that mounts the length adjustment device 14, a trailing cracking die 26 and a shell deflector 28. In between the second and the third portions is a nut cracking area. As seen in FIGS. 2 and 3, there is a groove 32 that allows the length adjustment device 14 to slide in and on in the third portion 24 toward and away from the nut cracking area. The nut 34 is held between the leading and trailing cracking dies 22, 26 in the nut cracking area 30 and above a shell debris passage 36 in the frame 4 to allow for easy disposal of fragments of shell 38, and, if desired, nut meat 40 also.

Displacement Generator:

Turning now to FIGS. 1, 2, 4, and 5, in the nut cracker 2 shown, the displacement generator 6 comprises a linear motor 42. The displacement generator 6 moves the force transmitter 8 from a first position 44 to a second position 46 a sufficient speed such that the resulting momentum produces enough force to crack the shell 38 of the nut 34. Though one or more linear motors 42 are preferable for the displacement generator, one or more solenoids 48 may be used in addition or in place of the linear motor 42. The nut cracker 2 also preferably includes a displacement resetter 50 that returns the force transmitter 8 to the first position 44. The displacement resetter 50 can be the same linear motor(s) 42 or a solenoid(s) 48 used in the displacement generator 6, or can be an additional one or more linear motor 42 or solenoid 48. In the embodiment shown, a separate solenoid 48 is used as the displacement resetter 50. The displacement resetter 50 preferably does not use a spring to return the force transmitter 8 back to the first position 44 after cracking a nut 34. Because the force transmitter 8 uses momentum to apply the force to the nut 34 being cracked, springs are an inferior means to reset the displacement. Additional force would need to be applied by the displacement generator 6 to move the force transmitter 8 from the first position 44 to the second position 46 against a spring bias. Additionally, springs wear out over time, so using a return spring would over time create a variation in the amount of force that is being overcome by the displacement generator 6 and hence transferred to the nut 34 by the force transmitter 8. Also, because of spring failure, the springs would eventually cease to reset the force transmitter 8 fully to the first position 44, which could lead to poor or no cracking of the nut shell 38. Therefore, by using a solenoid 48 or linear motor 42 to reset the displacement of the force transmitter 8 to the first position 44, the force transmitter 8 will consistently be returned to the full first position 44, a consistent amount of force will be transferred to the force transmitter 8 by the displacement generator 6, no spring bias will need to be overcome, and the non-spring displacement resetter 50 will last much longer than a spring. According to further embodiments (not shown), the displacement generator 6 and/or the displacement resetter 50 may be comprised of a double acting cylinder powered by compressed air or fluid, with the piston rod functioning as the force transmitter 8. Preferably a retraction bumper 51 is positioned at the far end of the force transmitter passage 53 to prevent damage to the force transmitter 8 when it is retracted by the displacement resetter 50. Spacers 55 may be used to support at least part of the force transmitter passage 53 and to space the displacement resetter 50 from the displacement generator 6, if separate elements are used. The displacement resetter 50 and the displacement generator 6 may also directly support part of the transmitter passage 53.

Force Transmitter:

The force transmitter 8 shown is the rotor 52 of the linear motor 42 of the displacement generator 6. The force transmitter 8 transmits the force created by the displacement generator 6 to the force distributor or cracking die 12. If the displacement generator 6 uses a solenoid 48, the force transmitter 8 could be the plunger 54 of the solenoid 48. The force transmitter 8 is preferably comprised of ferrous metal. A striking face 56 at the leading end 58 of the force transmitter 8 impacts the leading cracking die 22. The striking face 56 preferably comprises a hardened cap 60 or insert 62 inserted into a bore 63, made from a material that will not be easily deformed after repeated impacts, affixed to the force transmitter 8.

Cracking Die:

The force distributor or cracking die 12 distributes the force from the force transmitter 8 substantially evenly around an end of the nut 34. The nut cracker 2 preferably comprises a leading cracking die 22 and a trailing cracking die 26. As is shown in FIGS. 6-14, each cracking die 12 may have a special geometry 64 to account for the typical geometries of the nut 34 that is being cracked and/or to help remove the shell 38 from the nut meat 40 when the shell 38 is cracked. An impacted end 66 of the leading cracking die 22 is impacted by the striking face 56 of the force transmitter 8. The impacted end 66 preferably has a hardened cap 60 or insert 62 that will not be easily deformed after repeated impacts. The cracking dies 12 should be made of a rigid, yet light weight material so that the cracking dies 12 will not deform upon use, yet will still transfer the energy from the force transmitter 8 to the nut 34 as efficiently as possible. The greater amount of mass in the cracking die 12, the more energy that is required to accelerate the cracking die 12. Though in the embodiment shown, both the leading cracking die 22 and the trailing cracking die 26 are comprised of aluminum, the trailing cracking die 26 may be made of either a less robust material, like a hardened plastic, as it is not being impacted directly, and/or a heavier material, such a steel, nickel, and molybdenum, for example, as the trailing cracking die 26 is not being accelerated by the force transmitter—and should preferably remain substantially stationary during the crack. It is understood that the leading cracking die 22 may also be constructed of various additional metals, robust plastics, or metal alloys, for example, including steel.

Turning again to FIGS. 6-14, the cracking die may have a variety of geometries 64 as desired for different purposes. Preferably, the cracking die 12 may be made with a geometry 64 that promotes both circular and longitudinal cracks in the nut shell 38, while also helping remove the shell 38 from the nut meat 40 when the shell 38 is cracked. In a first embodiment in FIG. 6, a cracking die 12 with a smooth interior surface 68 is shown with a concavity 70 whose surface extends at multiple angles α, β to the cracking die axis. In effect, multiple conical reliefs are present in the cracking die 12. The inner concavity 74, which is the cavity that is the most recessed into the cracking die, has a smaller acute angle α to the cracking die axis 72 that fits the geometry of the nut 34. Adjacent to the inner concavity 74 is an outer concavity 76, which is the concavity less recessed into the cracking die 12, has a larger acute angle β to the cracking die axis 72 than does the acute angle α of the inner concavity 74. The larger acute angle β of the outer concavity 76 aids in promoting outward radial shell 38 movement upon nut 34 cracking. In the embodiment shown, an outer edge of the inner concavity 74 is directly adjacent to an inner edge of the outer concavity 75.

As shown in FIGS. 9-11 and 9AA, the cracking die 12 may also have teeth 78 extending from the surface 68 of the concavity 70. In the embodiment shown, the teeth 78 are circular concentric teeth 80 extending from the surface 68 of the outer concavity 76. As shown here, each concentric tooth 80 is a continuous circle, but gaps may be provided to affect the cracking dynamics of the nut cracking process. Preferably, an inner radial surface 82 of the concentric tooth 80 will extend parallel to the cracking die axis 72, forming an obtuse angle γ with the adjacent surface 68 of the concavity 70. An outer radial surface 84 of the concentric tooth 80 will extend substantially orthogonally from the surface 68 of the concavity 70, and slope toward the cracking die axis 72. Though the angle δ between the outer radial surface 84 of the concentric tooth 80 and the surface 68 of the concavity 70 is preferred to be a right angle, other non-right angles δ may be provided based on, for example, the different physical characteristics of the nut 34 being cracked and on the given acute angle β between the outer concavity 76 and the cracking die axis 72. The outer radial surface 84 of the concentric tooth 80 forces the shell 38 in a direction 85 radially outward and angled toward the circumferential midline 88 of the shell 38. A more obtuse angle δ between the outer radial surface 84 of the concentric tooth 80 and the surface 68 of the concavity 70 would force the shell 38 radially outward faster upon cracking, which may be desired for nuts 34 with thinner shells 38, or shells 38 closer to the nut meat 40. A more acute angle δ between the outer radial surface 84 of the concentric tooth 80 and the surface 68 of the concavity 70 would more gently cut into the shell 38 and force the shell 38 radially outward upon cracking. The length of the concentric tooth 80 may also vary based upon nut 34 being cracked. Though all the teeth 78 in the embodiment shown are of equal length, it is envisioned that some teeth 78 may be longer and others shorter, especially if the shell 38 for the nut 34 being cracked generally has a non-uniform thickness. Additionally, though the spacing of the teeth 78 in the embodiment shown is uniform, based on shell 38 characteristics, in other embodiments, on a same cracking die 12 some adjacent teeth 78 may be advantageously closer together and other adjacent teeth 78 further apart. Further, though all the teeth in the embodiment shown have a common first angle δ between the outer radial surface 84 of the concentric tooth 80 and the adjacent surface 68 of the concavity 70, and a common second angle γ between the inner radial surface 82 of the concentric tooth 80 and the adjacent surface 68 of the concavity 70, these angles δ, γ may vary on different teeth 78 on the same cracking die 12, and may even vary on the same teeth 78, depending on cracking dynamics desired. Though the teeth 78 in this and the other embodiments described are positioned on the surface 68 of the outer concavity 76, the teeth 78 may additionally or alternatively be positioned on the surface 68 of the inner concavity 74.

Figure 12:
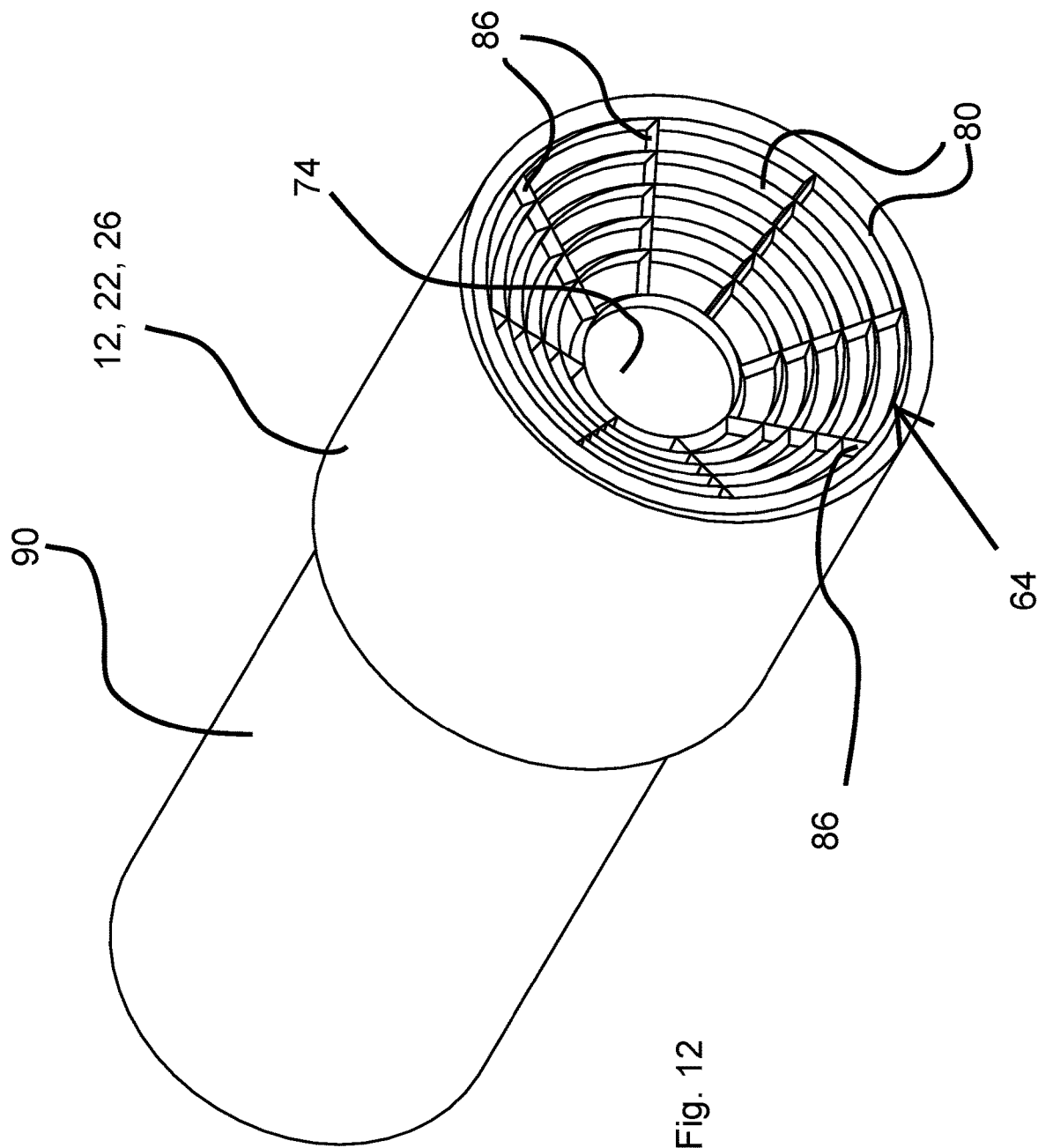
FIG. 12 is a perspective view of a third embodiment of a cracking die of FIG. 1.
Figure 13:
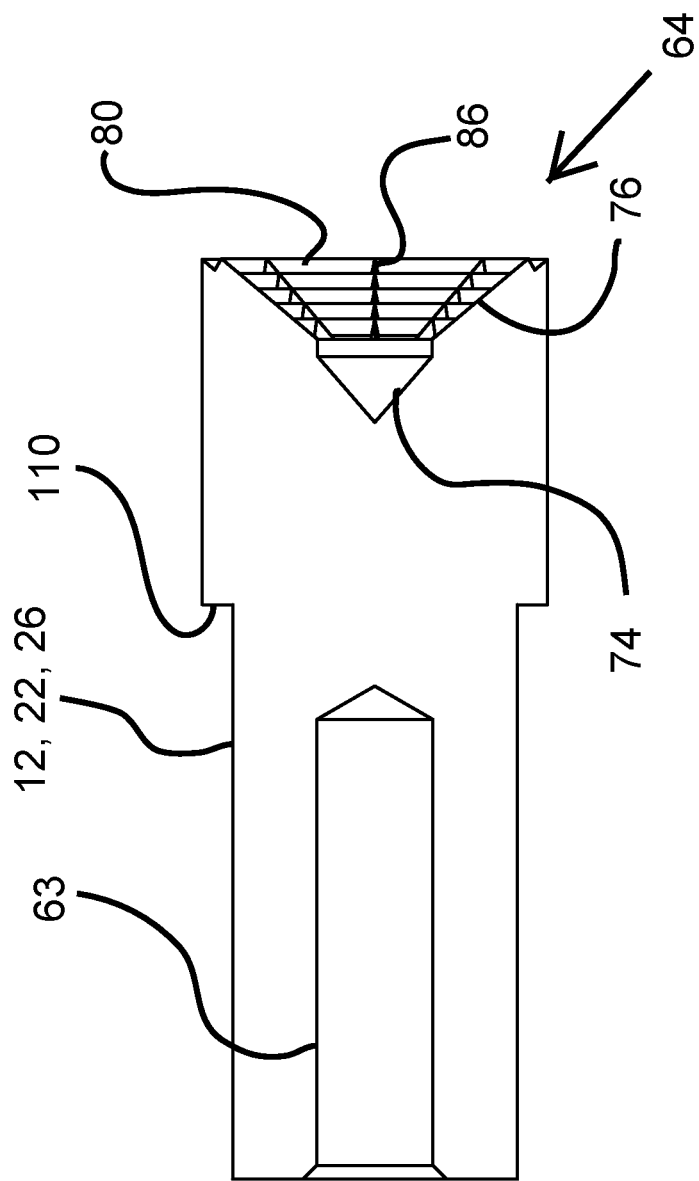
FIG. 13 is a side cross sectional view of the cracking die of FIG. 12.
Figure 14:
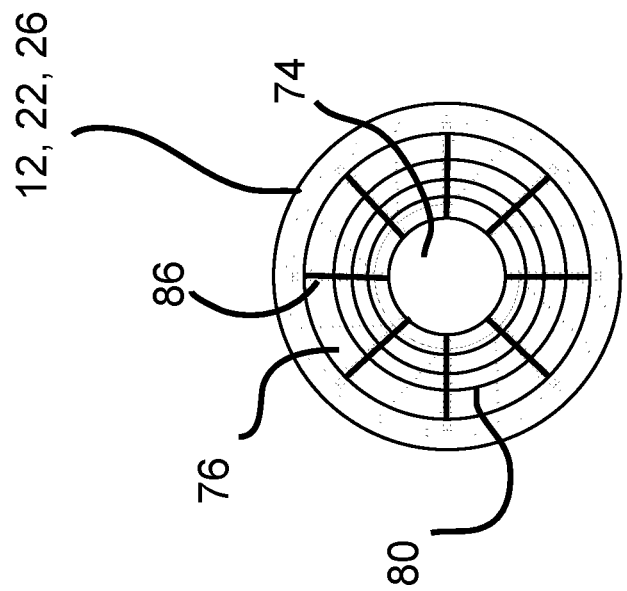
FIG. 14 is a is a front plan view of the cracking die of FIG. 12.

Turning next to FIGS. 12-14, in addition to the concentric teeth 80, acclivitous radially extending linear teeth 86 are shown. The linear teeth 86 shown are approximately the same height from the surface 68 of the concavity 70 as the concentric teeth 80, but instead of being concentric are arranged along the slope of the surface 68 of the concavity 70. In the embodiment shown, linear teeth 86 on opposite sides of the concavity from the cracking die axis 72, are each coplanar with each other and the cracking die axis 72. The linear teeth 86 act to slice through and crack the nut shell 38 in an axial direction and send cracks axially down the shell toward the circumferential midline 88 of the shell 38.

Figure 15:
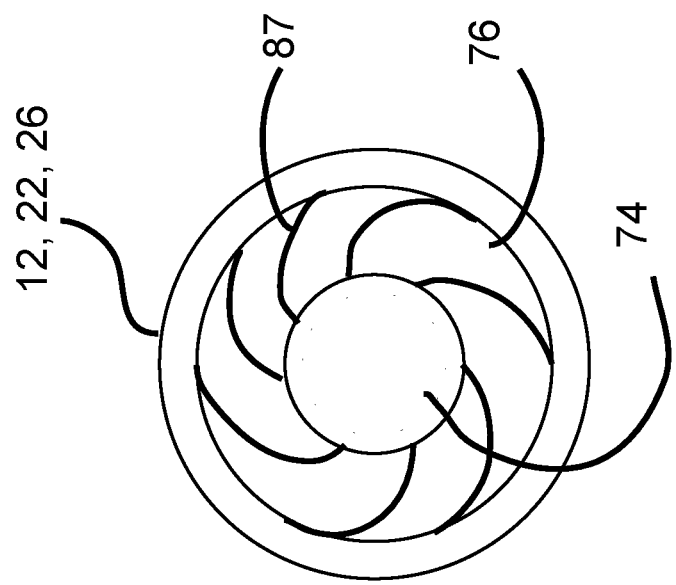
FIG. 15 is a is a front plan view of a fourth embodiment of the cracking die of FIG. 1.
Figure 16:
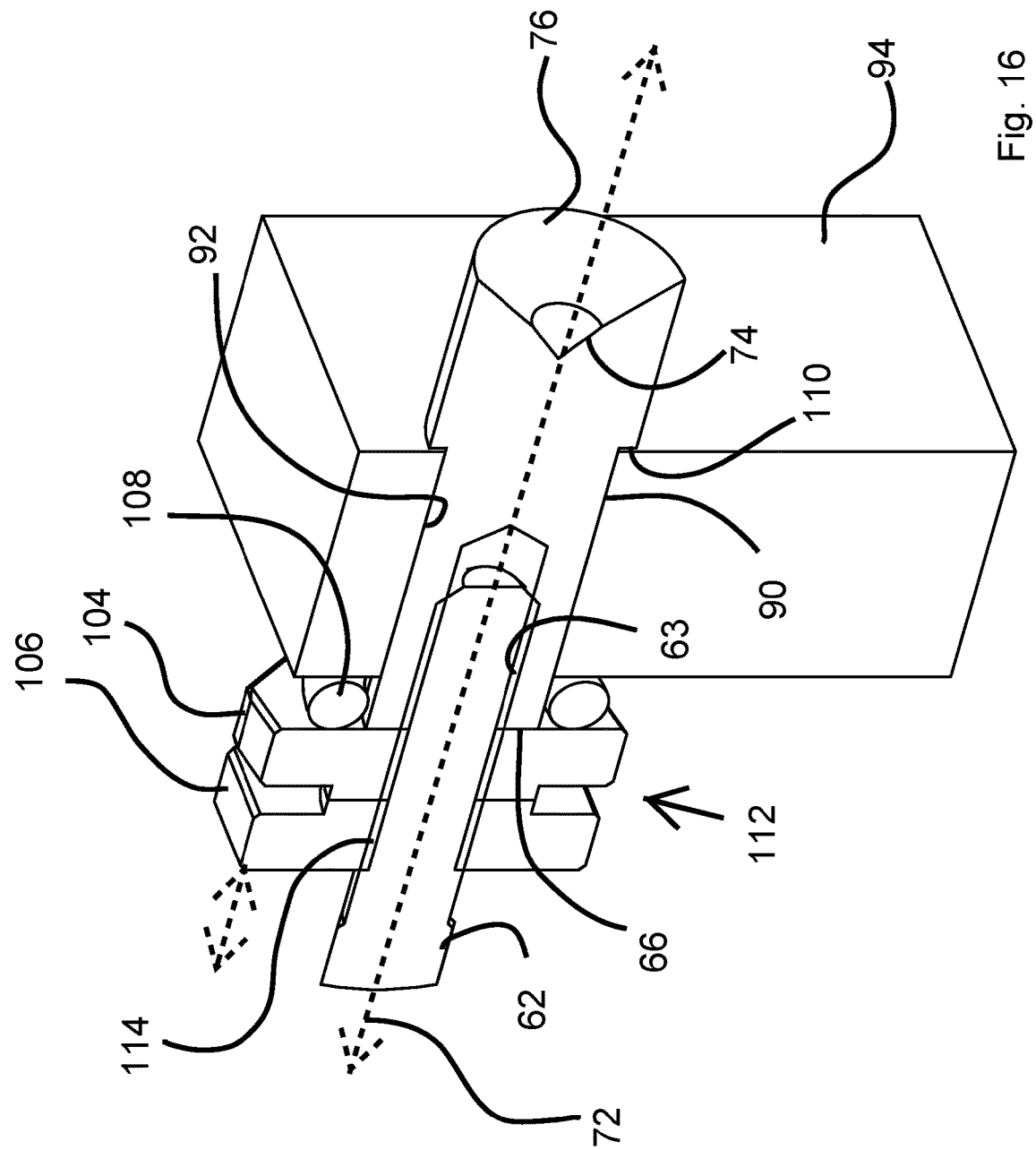
FIG. 16 is a perspective cross sectional view of a the leading cracking die mounted within the displacement limiter mount and the displacement limiter, all of FIG. 1.
Figure 17:
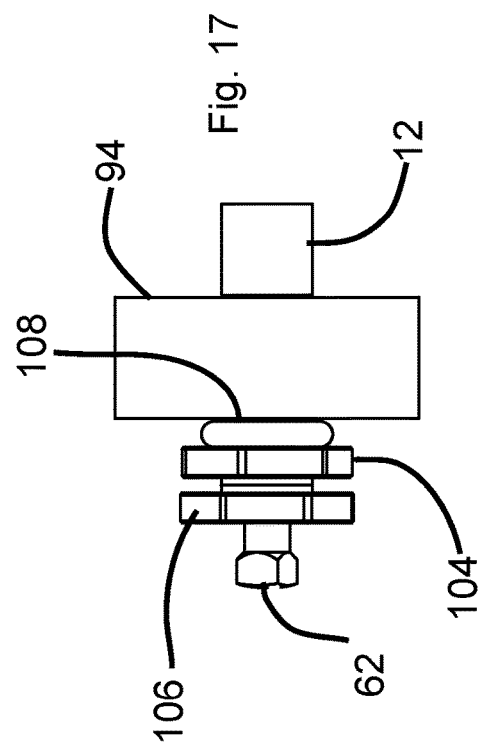
FIG. 17 is a top plan view of the displacement limiter of FIG. 16.
Figure 19:
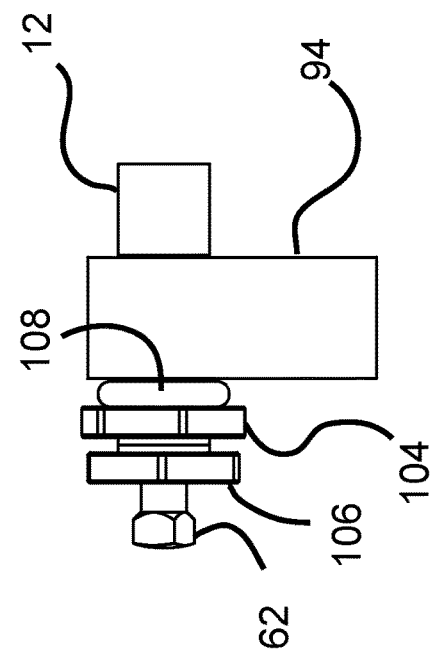
FIG. 19 is a side plan view of the displacement limiter of FIG. 16.
Figure 18:
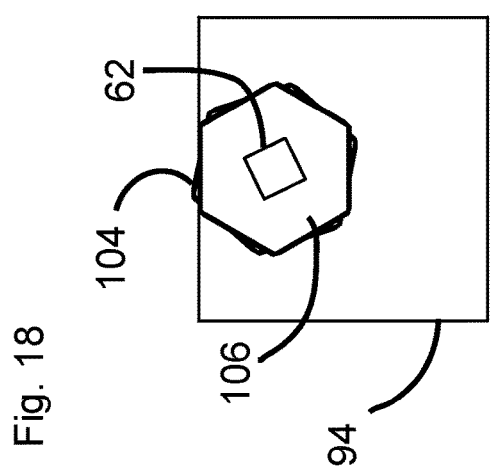
FIG. 18 is a front plan view of the displacement limiter of FIG. 16.
Figure 21:
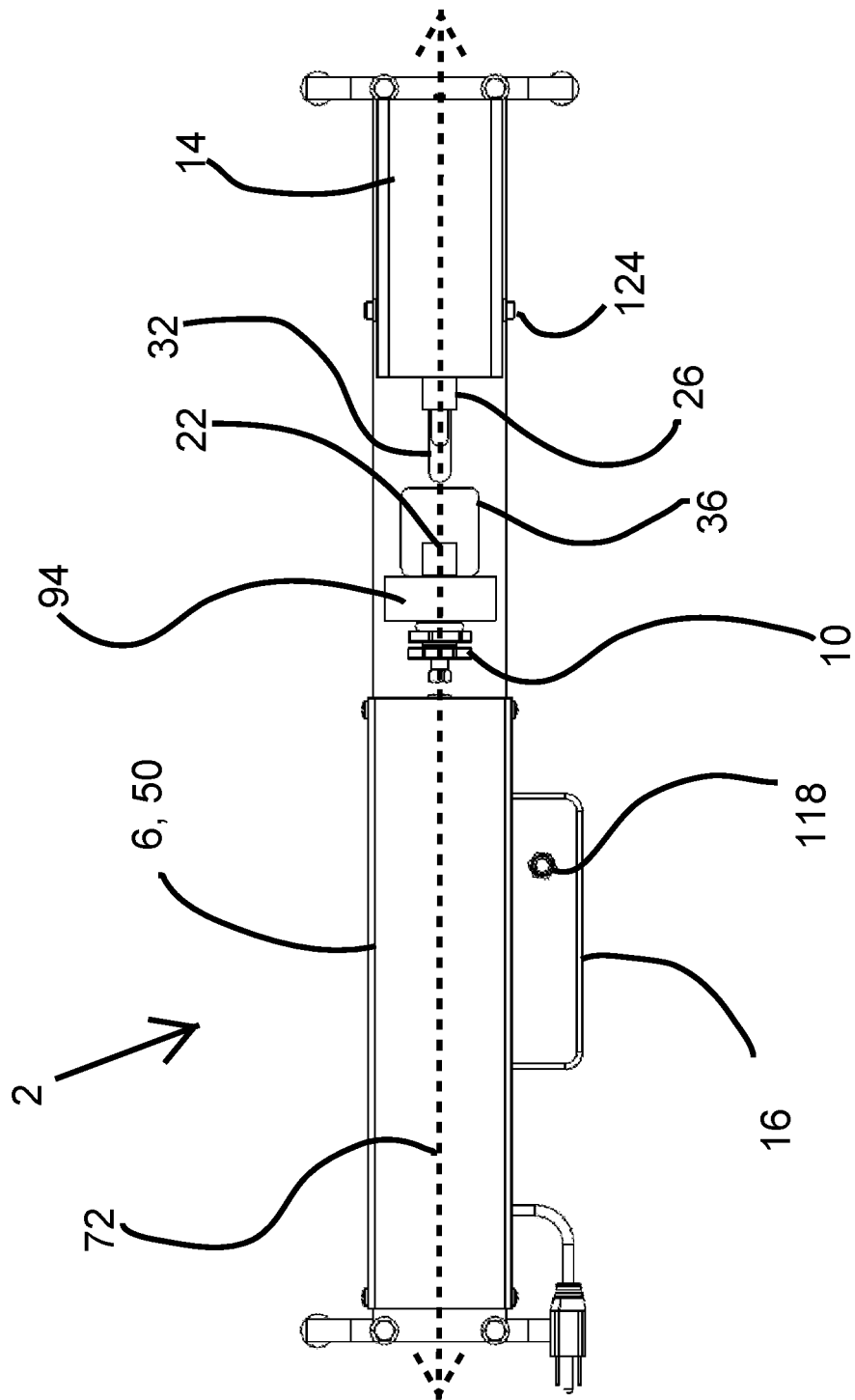
FIG. 21 is a top plan view of the nut cracker of FIG. 1.
Figure 23:
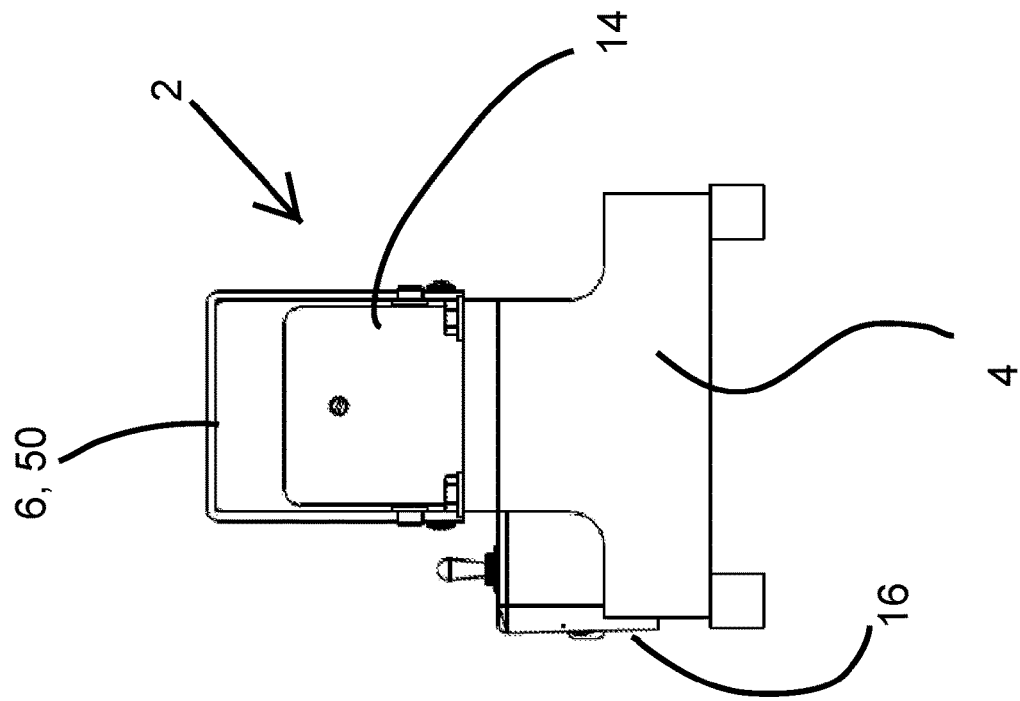
FIG. 23 is a back plan view of the nut cracker of FIG. 1.
Figure 22:
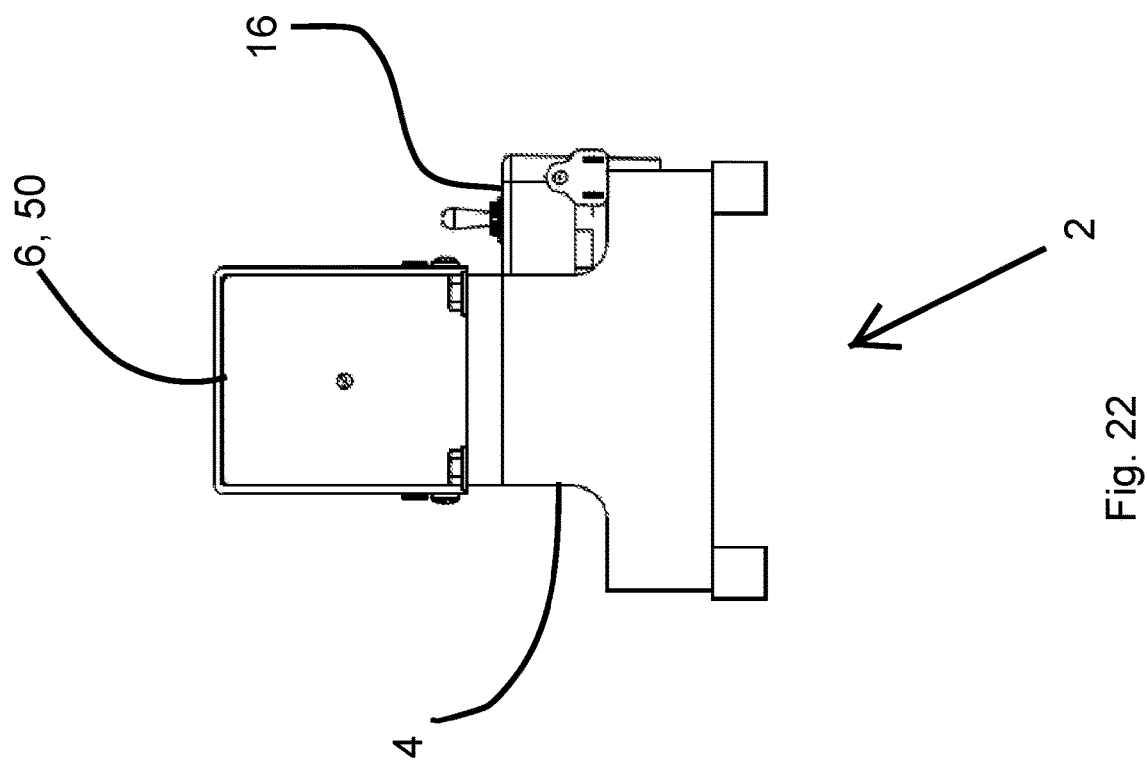
FIG. 22 is a front plan view of the nut cracker of FIG. 1.

Turning to FIG. 15, in an alternative embodiment of the linear teeth 86, the teeth 78 may be helically arranged on the surface 68 of the concavity 70. Helical teeth 87 would act to both axially crack the nut shell 38 and to twist the shell 38 off of the nut 34. The degree of helicity is determined by how much twisting is desired to be imparted on the shell 38. A higher degree of helicity will shear the shell 38 engaged by the teeth 87 and likely just remove the shell 38 engaged by the teeth 87. A lower degree of helicity will impart less torque on the shell 38, but will cause the twisting to be passed further down the shell 38 toward the circumferential midline 88 of the shell 38. It is anticipated that if helical teeth 87 are used on one of the leading and the trailing cracking dies 22, 26 that the other of the leading or trailing cracking dies 22, 26 will either have features to prevent relative rotation between the cracking die 22, 26 and the nut 34, or will have teeth 87 with an opposite helicity, imparting rotation in the opposite direction as the one of the leading and the trailing cracking dies 22, 26. Features to prevent relative rotation between the cracking die 22, 26 and the nut 34 include linear teeth 86 as shown in FIG. 12, features on the concentric teeth, such as studs, ribs, or splines (not shown) extending in a direction substantially parallel to the cracking die axis 72.

In a related manner, the cracking die 12 itself can be rotated about the cracking die axis 72 during or after the strike of the force transmitter 8. This would allow the cracking die 12 to impart torque to the nut shell 38 without requiring helical teeth 87. For example, the cracking die 12 of FIG. 12 could be used with a rotation means to twist the nut shell 38. One method of rotating the cracking die 12 is to provide angled or helical grooves in the outer circumference 90 of the cracking die 12 and mating teeth or splines in the inner surface of the cracking die passage 92 in the displacement limiter mount 94. In this way, when the force transmitter strikes the impacted end of the cracking die, as the cracking die is forced axially through the cracking die passage, the grooves and the teeth impart rotational motion on the cracking die which is transferred to the nut shell, and aids in separating the nut shell from the nut meat.

Another method to rotate the cracking dies 12 is by means of a small motor mounted under the frame 4. A belt could run through a slot in the frame 4 and around the cracking die 12, then around a pulley affixed to the motor shaft. The motor could be controlled by the electronics in the control module 16 or by a switch actuated by the user. Two motors could be used to rotate each of the two cracking dies 22, 26 in opposite directions in an effort to further facilitate the shell removal. In such an embodiment, the cracking dies 12 could also have a selectively rotating portion or face that is rotatable about the cracking die axis 72 independent of the remainder of the cracking die. The selectively rotating portion would be the portion that faces the nut 34. The selectively rotating portion would preferably become locked when axially compressed with sufficient force toward the remainder of cracking die 12, that is, away from the nut 34—in a manner similar to a clutch connection. In this way, the nut will be able to be loaded into the two cracking dies 22, 26 that are already spinning, but the nut and the rotatable faces on each cracking die 22, 26 that face the nut will initially be rotationally stationary with respect to each other and the frame 4. When sufficient axial compression force is placed on the cracking dies 22, 26 and the nut 34, the rotating faces will axially contact the remainder of the respective cracking die 22, 26 (like an engaging clutch) and will begin to spin with the cracking die 22, 26 and transmit torque to the nut 34. When the axial compression falls below a set level, the rotating faces will no longer be transmit torque from the spinning remainder of the respective cracking die 22, 26, and the rotating face will then be able to freely rotate with respect to the remainder of the cracking die (like a disengaged clutch). The rotating face will preferably be spring or otherwise biased in the disengaged axial direction.

In a related manner, not shown, axially aligned splines or other projections along one of the inner surface of the cracking die passage 92 and the outer circumference 90 of the cracking die 12 and mating grooves in the other of the inner surface of the cracking die passage 92 and the outer circumference 90 of the cracking die 12 provide for limited axial motion of the cracking die 12 with maintaining no rotational motion. This can be desired with a cracking die 12 having helical teeth 87, for example.

According to a further embodiment, the force transmitter 8 could be unitary or otherwise axially fixed with the leading cracking die 22. Instead of striking the shell 38 with momentum, the combined force transmitter 8/leading cracking die 22 would compress the shell 38 with the force of the force generator 6. The cracking die 12 portion of the combined force transmitter 8/leading cracking die 22 would preferably have a specially designed profile that would mate to each different type of nut substantially closely. Ribs or teeth 78 as described above, that would act to fracture the shell 38 and pull the shell 38 away from the nut meat 40, could also be incorporated into the design of the combined force transmitter 8/leading cracking die 22.

Figure 9:
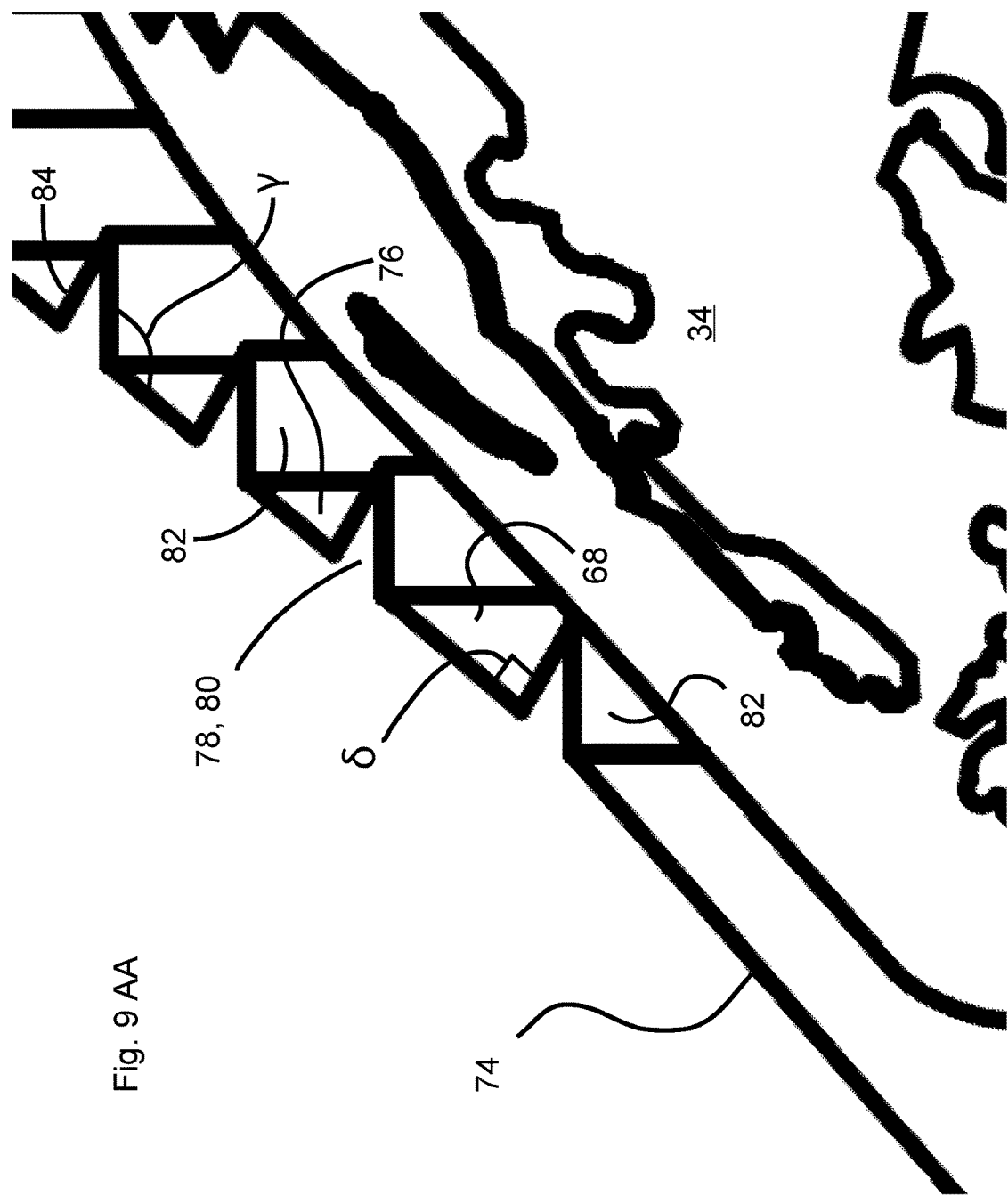
FIG. 9 is a partial cross sectional view of a second embodiment of a leading and a trailing cracking die of FIG. 1, including an embodiment of circumferential fingers, engaging a pecan nut.
Figure 10:
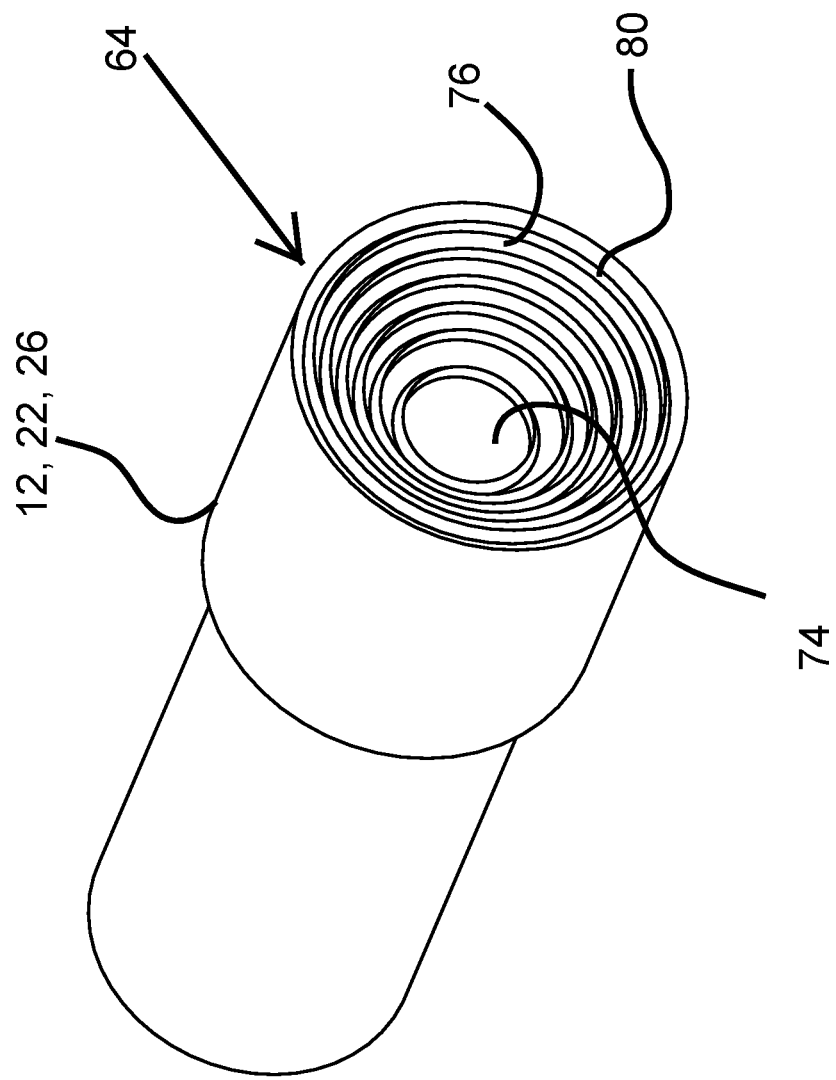
FIG. 10 is a perspective view of one of the leading and the trailing cracking dies of FIG. 9.
Figure 11:
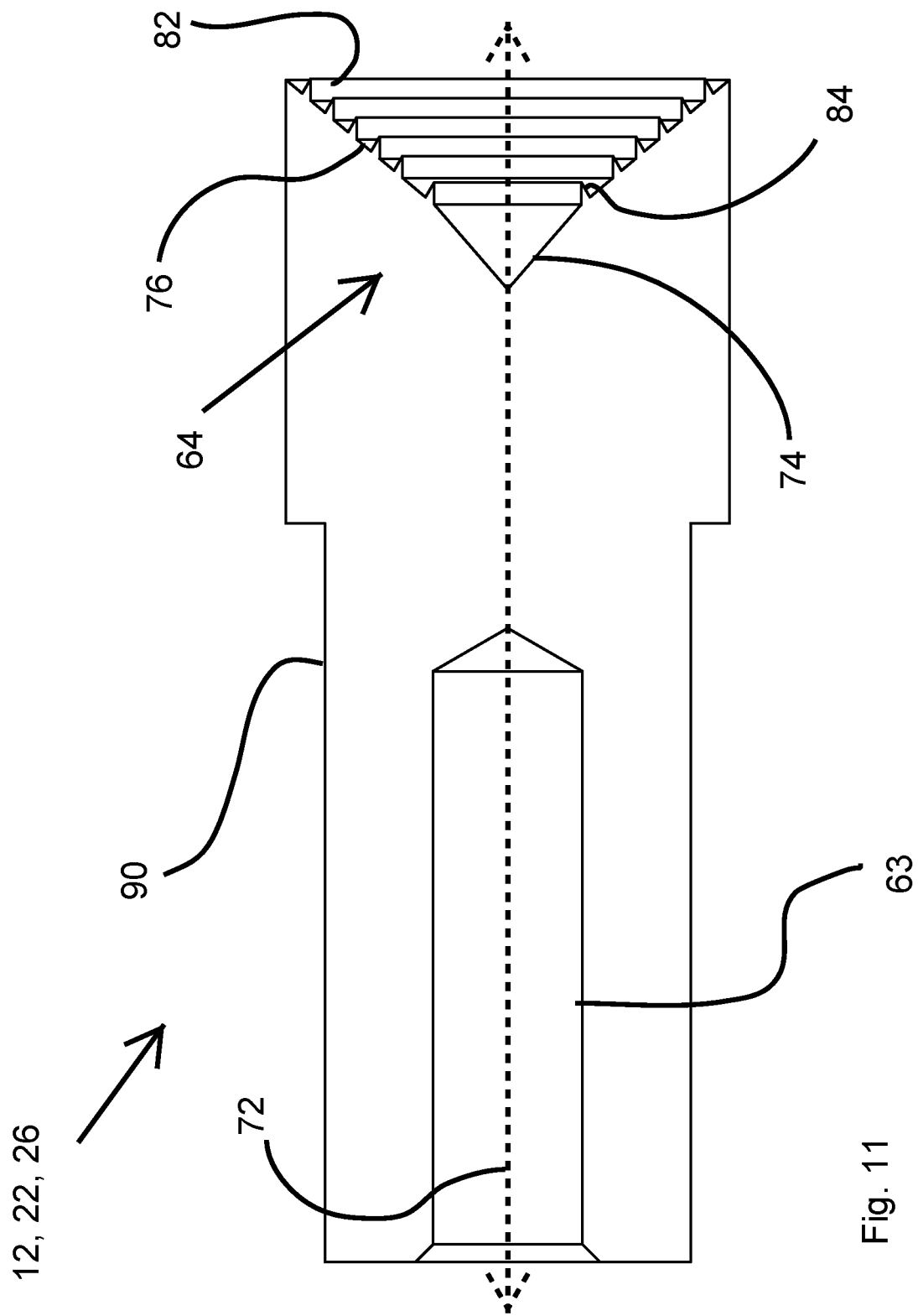
FIG. 11 is a side cross sectional view of the cracking die of FIG. 10.

Circumferential Fingers:

In an additional embodiment, circumferential fingers 96 retain shell flexing and expansion 98 around the circumferential midline 88 of the nut shell 38. By engaging and retaining radial expansion 98 of the shell 38, as the shell 38 is compressed axially 100 by the cracking dies 22, 26, instead of flexing along the circumferential midline 88, the shell 38 is forced to flex 100 to a greater extent between the cracking dies 12 and the circumferential midline 88. The circumferential fingers 96 are preferably constructed of metal or hard plastic to maintain structural integrity upon repeated use. The circumferential fingers 96 retract to allow the nut 34 to be placed in the cracking dies 12 and then engage after the nut 34 is in place. Preferably, there are a plurality of circumferential fingers 96, each engaging with the shell an equidistant apart along the nut circumferential midline 88 (only two are shown in FIG. 9 for clarity. Alternatively, for ease of access to the nut 34 for example, a single circumferential finger 96 may be used, for example a single circumferential finger 96 engaging the nut shell 38 from below (at 270 degrees for a cross section of the shell along the circumferential midline), or a plurality of non-equidistant engaging circumferential fingers may be used, for example a pair of circumferential fingers engaging the nut shell 38 from substantially below (at 225 degrees and 315 degrees, for example, for a cross section of the shell along the circumferential midline).

The circumferential fingers have an engaging portion 102 with which to engage with the nut shell 38. The engaging portion 102 may be, for example, flat, as shown, or rounded or spiked points. The flat and rounded point engaging portions 102 will retain the shell 38 better as a fulcrum for the shell 38 to flex 98 around. Alternatively, the spiked point engaging portion 102 will pierce the shell 38 when the shell flexes and expands 98 along the circumferential midline 88, providing a dependable break in the shell at the midpoint of the shell, if desired.

As an alternative embodiment, the circumferential fingers engaging portion 102 may create one or more continuous or semi-continuous collars (not shown) around the circumferential midline of the nut shell. The collars act similarly to the circumferential fingers 96 in retaining radial expansion 98 of the shell 38 along the circumferential midline 88. Also similar to the circumferential fingers 96 engaging portions 102, the collar may have a relatively wide, flat or rounded engaging surface that acts as a fulcrum around which the shell 38 flexes and expands 98, causing cracks on either axial side of the collar. Alternatively, the collar may have a sharp, knife like engaging surface which acts to cut into the shell 38 at the collar as the shell 38 expands 98 around the circumferential midline 88 due to axial compression 100.

The circumferential fingers 98 preferably retract against a spring bias when the shell deflector 28 is pulled back over the length adjustment device 14 to disengage. The circumferential fingers 96 preferably engage the shell 38 with spring force and then are friction locked when the shell deflector 28 is pulled over the nut 34 and is engaged. The retraction and engagement process can also be powered with sensors and motors.

Displacement Limiter:

Turning now to FIGS. 16-19, the displacement limiter 10 limits the displacement of the force transmitter 8 and the cracking die 12 so as to mitigate damage to the nut meat 40. The displacement limiter 10 has a displacement limiter mount 94, an adjusting nut 104, a locking nut 106, and a shock absorber 108. The shock absorber 108 can be in the form of a rubber, plastic, or gel piece or spring, for example, that softens the blow between adjusting nut 104 and the displacement limiter mount 94. The displacement limiter mount 94 is mounted to the frame 4 and includes the cracking die passage 92 which radially restrains the cracking die 12 inside cracking die passage 92. Additionally, the cracking die passage 92 may rotationally restrain the cracking die 12, or may actively rotate the cracking die 12. The cracking die passage allows limited axial movement of the die 12 along the cracking die axis 72. According to the embodiment shown, the displacement limiter mount limits axial displacement of the cracking die 12 axially away from the nut cracking area 30, via the cracking die passage 92 being smaller than a shoulder 110 or other radial projection on the cracking die. The displacement limitter 10 includes a threaded cylinder 112 that is turned either manually or automatically (by way of a servo motor or other such device), to adjust the axial displacement allowed by the cracking die 12 for cracking the nut. In the embodiment shown the threaded cylinder 112 comprises the adjusting nut 104 and the locking nut 106. The adjustment is easily set, and once set, requires no more interaction by the user. The threaded cylinder 112 in the embodiment shown turns on outer threads 114 formed on the external surface of the insert 62, which is axially and rotationally fixedly attached to the cracking die 12.

In the case of the combined force transmitter 8/leading cracking die 22, an adjustable shoulder 110 could be placed on the force transmitter 8. This shoulder 110 would be adjusted along the length of the force transmitter 8 such that when it hits a rigid stop, the displacement limiter mount 94 for example, the displacement of the combined force transmitter 8/leading cracking die 22 is limited, thus still protecting the nut meat 40 inside of the shell 38.

Length Adjustment Device:

The length adjustment device 14 supports the trailing cracking die 26 and the shell deflector 28. The position of the length adjustment device 14 is adjustable along the frame 4, preferably along the groove 32 in the frame 4 with a releasable locking device 116. The releasable locking device can be a nut and screw, a friction lock, an electromagnetic position lock, or a motor and gear, for example. The length is adjustable to account for the various length differences of the various nuts 34 to be cracked in the nut cracker 2, and in at least one embodiment, to allow nuts 34 to be loaded into the nut cracker 2. According to further embodiment, instead of using a releasable locking device 116, once the nut 34 is loaded, the length adjustment device 14 may be manually retained in its location along the frame 4 by the user, for example, by the user holding the on to the shell deflector 14 with the users hand. The length adjustment device 14 preferably has the trailing cracking die 26 attached to it, as shown in FIG. 1. Alternatively, a trailing nut seat (not shown) formed of rubber, plastic, metal or wood, for example may be used in place of the trailing cracking die 26 to axially retain the nut 34 and provide axial support for the leading cracking die 22.

Shell Deflector:

The shell deflector 28 is a cover or guard that deflects loose particles of the nut shell 38 away from the operator or other areas that should remain shell 38 free. The shell deflector 28 is slideable along the outside of the length adjusting device 14 so as to cover the nut cracking area 30. According to one embodiment, when the shell deflector 28 fully slides over the nut cracking area 30, the shell deflector 28 and length adjusting device 14 axially lock in place, to prevent inadvertent injury from the cracking process. According to another embodiment, when the shell deflector 28 fully slides over the nut cracking area 30, the displacement generator 6 automatically engages, moving the force transmitter 8 from the first position 44 to the second position 46, the force transmitter 8 striking the cracking die 12, and the displacement resetter 50 automatically engaging, to return the force transmitter 8 back to the first position 44. This can be accomplished electronically with sensors that detect when the shell deflector 28 is fully closed, or easily with an input device 118, discussed below, disposed on a surface of the displacement limiter mount 94 facing the nut cracking area 30, such that when the shell deflector 28 fully slides over the nut cracking area 30, a leading edge or other portion of the shell deflector 94 engages the input device 118, and initiates the displacement generator 6 and displacement resetter 50. While preferably included in the nut cracker 2, according to additional embodiments, no shell protector 28 is provided. The shell deflector 28 is preferably spring biased open with a spring 120, as shown, and is supported by axial grooves 122 in either side of the shell deflector gliding on lateral projections 124 from the sides of the length adjustment device 14.

Control Module:

The control module 16 controls one or more of the units 6, 8, 10, 12, 14, 50 of the nut cracker 2. The control module 16 shown in FIG. 1 is located on the first portion 18 of the frame 4 adjacent to the force generator 6 housing, but could be located elsewhere. There is an activation switch or other input device 118 on the control module 16 to receive commands from the user and translate the user commands to cause actuation of the one or more devices 6, 8, 10, 12, 14, 50 on the nut cracker. In the embodiment shown, the input device 118 is an activation switch 118 in the form of an engage-off-reset toggle switch that when clicked to the right in the drawing activates the displacement generator 6 to send the force transmitter 8 from the first position 44 to the second position 46. When the activation switch 118 is clicked to the left in the drawing, the control module 16 activates the displacement resetter 50 to move the force transmitter 8 from the second position 46 back to the first position 44. At rest, the toggle activation switch 118 is in an off or unpowered position.

In additional embodiments, the control module 16 may control additional functions of the nut cracker 2 and/or control additional aspects of the displacement generator 6 and displacement resetter 50. The control module 16 could variably control the momentum imparted by the displacement generator 6 to the force transmitter 8, according to requirements input by the user, preferably based on the type and/or size of nut 34 being cracked. Likewise, the control module 16 could also receive input from the user to set the displacement limiter 10. The length adjustment device 14 could be set by the control module 16 automatically by sensing, via a sensor, the presence of a nut 34 to be cracked, the length of the nut 34, and adjusting the length adjustment device 14 such that the nut 34 was firmly retained by the one or more cracking die 12 for cracking. The displacement resetter 50 could be automatically controlled by the control module 16 as well to return the force transmitter 8 back to the first position 22 after reaching the second position 24. The user may input instructions into the control module 16 via other input devices 118, such as buttons, keypad, touchscreen, for example, or via remote input from a wireless or wifi connection to a handheld or other computer or mobile device, for example. All of these items could be controlled in relation to each other with an electronic control unit running an algorithm that takes into account user inputs, measurements taken in real time, and data relating to the various nuts 34 to be cracked, stored in a memory unit. However, in the embodiment shown, the control module 16 is a simple switch/bridge rectifier/fuse circuit that energizes the displacement generator 6 and the displacement resetter 50.

To operate the nut cracker 2 of the embodiment shown in FIG. 1, the user places a nut 34 in front of the leading cracking die 22, then slides the length adjustment device 14 inward until the trailing cracking die 26 is adjacent to the nut 34 and the nut 34 is held on both ends by respective cracking dies 22, 26. The shell deflector 28 is slid in place over the nut 34 and the nut cracking area 30. While holding the shell deflector 28 and the length adjustment device 14 in place, the input device is toggled toward the nut cracking area 30, signaling the control module 16 the user's desire to crack the nut 34. When the control module 16 is signaled, the control module 16 causes the displacement generator 6 to move the force transmitter 8 toward the leading cracking die 22 at a rapid pace. Once the force transmitter 8 impacts the leading cracking die 22, the force is transmitted to leading cracking die 22 and is then distributed to the nut 34, causing the shell to compress in an axial direction 100, to flex outward in a radial direction 98, and to crack. The shell deflector 28 and the length adjustment device 14 are then retracted to retrieve the cracked nut 34. The cracked nut 34 may optionally be allowed to fall through the shell debris passage 36 in the frame. If the nut meat 40 is damaged, the user may set the displacement limiter device 10 to reduce the amount of allowed axial displacement of the cracking die 12. If the nut shell 38 is not cracked sufficiently, the displacement limiter 10 may be adjusted to increase the amount of allowed axial displacement of the cracking die.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

We claim:

1. A powered nutcracker comprising;
   a frame;
   a first nut cracking die mounted to the frame; and
   a displacement generator mounted to the frame which provides force to move the first nut cracking die to crack a nut;
   wherein the first nut cracking die has a concavity with a surface extending at first and second angles to a cracking die axis;
   the first angle is smaller than the second angle;
   the first angle is defined in a surface of an inner concavity of the first nut cracking die and the second angle is defined in a surface of an outer concavity of the first nut cracking die,
   both the first angle and the second angle are smaller than 90 degrees;
   the inner concavity is adjacent to the outer concavity,
   the inner concavity extends at a first single angle from a radial center of the first cracking die to the outer concavity, and
   the outer concavity extends at a second single angle from the inner concavity to a radially outer edge of the first cracking die.

2. The powered nutcracker of claim 1 wherein the displacement generator includes a linear motor.

3. The powered nutcracker of claim 2 wherein a rotor of the linear motor is a force transmitter that transmits force from the displacement generator to the first nut cracking die.

4. The powered nutcracker of claim 3 wherein the displacement generator transmits force to the nut cracking die by striking the nut cracking die.

5. The powered nutcracker of claim 3 further comprising a resetter that forces the force transmitter from a second position to a first position.

6. The powered nutcracker of claim 5 wherein the resetter includes a solenoid.

7. The powered nutcracker of claim 2 further comprising a second nut cracking die mounted to the frame, wherein the first nutcracking die axially engages the nut on a first axial end and the second nut cracking die axially engages the nut on a second axial end.

8. The powered nutcracker of claim 7 further comprising a length adjustment device that connects the second nut cracking die to the frame and allows the second nut cracking die to move in an axial path toward and away from the first nut cracking die.

9. The powered nutcracker of claim 8 further comprising a shell deflector adjustably mounted to the length adjustment device to deflect nut shell debris during a cracking of the nut.

10. The powered nutcracker of claim 1 further comprising the first nut cracking die having a geometry that aids in moving shell debris away from the nut during a crack.

11. The powered nutcracker of claim 1 further comprising the first nut cracking die having a plurality of concentric linear teeth disposed on the surface of the concavity of the first nut cracking die, where a radially inner facing edge of the linear teeth extend parallel to the cracking die axis.

12. The powered nutcracker of claim 1 further comprising the first nut cracking die having one or more concentric teeth disposed on a surface of the concavity of the first nut cracking die.

13. The powered nutcracker of claim 12 further comprising the first nut cracking die having one or more linear teeth disposed on the surface of the concavity of the first nut cracking die.

14. The powered nutcracker of claim 1 further comprising the first nut cracking die having one or more linear teeth disposed on a surface of the concavity of the first nut cracking die.

15. The powered nutcracker of claim 1 further comprising the first nut cracking die having one or more helical teeth disposed on a surface of the concavity of the first nut cracking die.

16. A powered nutcracker comprising;
    a frame;
    a first nut cracking die mounted to the frame;
    a displacement generator mounted to the frame which provides force to move the first nut cracking die to crack a nut, the displacement generator including a linear motor; and
    a displacement limiter that adjustably limits an axial displacement of the nut cracking die;
    wherein the first nut cracking die has a concavity with a surface extending at first and second angles to a cracking die axis; and
    the first angle is smaller than the second angle; wherein the first angle is defined in a surface of an inner concavity of the first nut cracking die and the second angle is defined in a surface of an outer concavity of the first nut cracking die, and both the first angle and the second angle are smaller than 90 degrees; wherein the inner concavity is adjacent to the outer concavity, the inner concavity extends at a first single angle from a radial center of the first cracking die to the outer concavity, and the outer concavity extends at a second single angle from the inner concavity to a radially outer edge of the first cracking die.

17. A powered nut cracker comprising:

a frame;

a first nut cracking die radially captively mounted to the frame within a displacement limiter, the displacement limiter adjustably limiting an axial displacement of the first nut cracking die;

a second nut cracking die radially captively mounted to the frame within a length adjuster, the length adjuster allowing the second nut cracking die to be positioned at variable distances from the first nut cracking die;

a force generator mounted to the frame;

a linear motor being the force generator;

a rotor of the linear being a force transmitter transmitting a force from the force generator to the first nut cracking die;

one of the first and the second nut cracking die having a concavity with a surface extending at first and second angles to a cracking die axis, where the first angle is smaller than the second angle;

the first angle is defined in a surface of an inner concavity of the first nut cracking die and the second angle is defined in a surface of an outer concavity of the first nut cracking die;

the inner concavity is adjacent to the outer concavity;

the first nut cracking die having one or more concentric teeth disposed on the surface of one of the inner and the outer concavity of the nut cracking die and one or more linear teeth disposed on the surface of the surface of one of the inner and the outer concavity of the first nut cracking die; and a radially inner facing surface of the one or more linear teeth extending from the concavity parallel to the cracking die axis.

* * * * *